US012415641B2

(12) United States Patent
Apol

(10) Patent No.: US 12,415,641 B2
(45) Date of Patent: Sep. 16, 2025

(54) BOX FORMING CAROUSEL APPARATUS, AND, PACKAGE FORMING SYSTEM

(71) Applicant: Logicraft Industrial Systems, Inc., Hopkins, MI (US)

(72) Inventor: Jason J. Apol, Hopkins, MI (US)

(73) Assignee: Logicraft Industrial Systems, Inc., Hopkins, MI (US)

( * ) Notice: Subject to any disclaimer, the term of this patent is extended or adjusted under 35 U.S.C. 154(b) by 90 days.

(21) Appl. No.: 18/098,034

(22) Filed: Jan. 17, 2023

(65) Prior Publication Data

US 2023/0227193 A1 Jul. 20, 2023

Related U.S. Application Data

(60) Provisional application No. 63/300,183, filed on Jan. 17, 2022.

(51) Int. Cl.
*B65B 43/60* (2006.01)
*B31B 50/00* (2017.01)
(Continued)

(52) U.S. Cl.
CPC .......... *B65B 43/60* (2013.01); *B31B 50/0042* (2017.08); *B31B 50/005* (2017.08);
(Continued)

(58) Field of Classification Search
CPC ......... B65B 43/10; B65B 43/50; B65B 43/60; B65B 19/223–226; B65B 43/26; B65B 43/265; B65B 43/285; B65B 43/305; B65B 43/325; B65B 43/345; B65B 43/365; B65B 11/28; B65B 11/30; B65B 11/32; B65B 11/36; B65B 11/38; B65B 11/40; B65B 11/42; B65B 11/46; B65B 5/024; B65B 5/06; B31B 50/004–0044; B31B 50/005; B31B 50/024; B31B 50/54; B31B 50/262
(Continued)

(56) References Cited

U.S. PATENT DOCUMENTS 480,239 A * 8/1892 Schilling ................ B65B 11/28 53/234
2,696,702 A * 12/1954 Martin .................... B65B 11/42 53/372.8

(Continued)

*Primary Examiner* — Joshua G Kotis
(74) *Attorney, Agent, or Firm* — The Watson IP Group; Jovan N. Jovanovic

(57) ABSTRACT

A box forming carousel apparatus including a frame, a rotating carton retainer, a first side carton folding assembly, a second side carton folding assembly and an axle. The frame has a bottom, and first and second sides. The rotating carton retainer is rotatably coupled to the frame and has a plurality of slot assemblies radially spaced apart, each slot assembly having a leading wall, a following wall and a base wall. Each slot assembly structurally configured to retain a box therein. The first side carton folding assembly is structurally configured to fold a plurality of flaps of the box on a first side thereof. The second side carton folding assembly is structurally configured to fold a plurality of flaps of the box on a second side thereof. The axle extends between the first side and the second side of the frame spaced apart from the bottom of the frame.

19 Claims, 16 Drawing Sheets

(51) Int. Cl.

| | |
|---|---|
| ***B31B 50/54*** | (2017.01) |
| ***B31B 50/62*** | (2017.01) |
| ***B65B 5/02*** | (2006.01) |
| ***B65B 5/06*** | (2006.01) |
| ***B65B 43/10*** | (2006.01) |

(52) U.S. Cl.
CPC ............ *B31B 50/54* (2017.08); *B31B 50/624* (2017.08); *B65B 5/024* (2013.01); *B65B 5/06* (2013.01); *B65B 43/10* (2013.01)

(58) Field of Classification Search
USPC ............................................. 53/234; 493/164
See application file for complete search history.

(56) References Cited

U.S. PATENT DOCUMENTS

| | | | | | |
|---|---|---|---|---|---|
| 2,864,288 | A * | 12/1958 | Engleson | B31B 50/00 493/317 |
| 3,253,387 | A * | 5/1966 | Schmermund | B65B 11/46 53/234 |
| 3,628,309 | A * | 12/1971 | Seragnoli | B65B 11/58 53/54 |
| 3,924,386 | A * | 12/1975 | Schmermund | B65B 19/223 53/236 |
| 4,092,816 | A * | 6/1978 | Seragnoli | B65B 19/226 53/234 |
| 4,208,854 | A * | 6/1980 | Seragnoli | B65B 19/20 53/575 |
| 4,509,310 | A * | 4/1985 | Focke | B65B 11/58 53/64 |
| 4,559,758 | A * | 12/1985 | Gamberini | B65B 61/002 53/53 |
| 5,168,690 | A * | 12/1992 | Quadrana | B65B 19/24 493/911 |
| 5,357,734 | A * | 10/1994 | Focke | B65D 5/5495 53/579 |
| 5,906,087 | A * | 5/1999 | Boldrini | B65B 51/023 53/462 |
| 7,200,978 | B1 * | 4/2007 | Focke | B65B 19/20 53/225 |
| 2006/0243786 | A1 * | 11/2006 | Martelli | B65B 43/185 232/35 |
| 2012/0031044 | A1 * | 2/2012 | Draghetti | B65B 11/16 53/203 |
| 2018/0222608 | A1 * | 8/2018 | Hutter | B65B 5/024 |
| 2019/0016486 | A1 * | 1/2019 | Castellari | B31B 50/024 |
| 2019/0055041 | A1 * | 2/2019 | Castellari | B65B 43/10 |
| 2020/0254707 | A1 * | 8/2020 | Iwasa | B65B 5/024 |
| 2021/0403187 | A1 * | 12/2021 | Franz | B65B 41/10 |
| 2024/0116660 | A1 * | 4/2024 | Biondi | B65B 5/06 |
| 2024/0217684 | A1 * | 7/2024 | Biondi | B65B 35/08 |

* cited by examiner

BOX FORMING CAROUSEL APPARATUS, AND, PACKAGE FORMING SYSTEM

CROSS-REFERENCE TO RELATED APPLICATION

The present application claims priority from U.S. Pat App. Ser. No. 63/300,183, filed Jan. 17, 2022, entitled "Box Forming and Can Filling Apparatus", the entire specification of which is hereby incorporated by reference in its entirety.

BACKGROUND OF THE DISCLOSURE

1. Field of the Disclosure

The disclosure relates in general to a packaging apparatus, and more particularly, to a box forming and can filling carousel apparatus, as well as a package forming system that includes a box having cans positioned therein.

2. Background Art

Craft brewing, also known as microbrewing, is a brewery process that makes small volumes of beer, typically less than large breweries. Small breweries typically produce such small volumes of beer, these small breweries typically being independently owned. To differentiation themselves from large breweries, these small breweries market themselves as using varied brewing techniques and having new flavors that are not available from large breweries. Craft brewing has become increasing popular in recent years, with a trip to a beverage store providing magnitudes of choices.

As small brewers have smaller budgets that large brewers, and smaller numbers of containers to package, packing such containers is a significant burden to get their product to stores and consumers. In many instances, such small brewers manually assemble packages (i.e., boxes that often have four or six cans within a sealed box), in a time consuming, labor intensive process. Due to the relatively small volume, it is difficult to automate such a system.

Additionally, for many brewers, floor space is at a premium. In many instances, there is not sufficient room to utilize anything more than a manual assembly of a packages.

SUMMARY OF THE DISCLOSURE

The disclosure is directed in an aspect to a box forming carousel apparatus comprising a frame, a rotating carton retainer, a first side carton folding assembly, a second side carton folding assembly and an axle. The frame has a bottom, a first side and a second side. The rotating carton retainer is rotatably coupled to the frame. The rotating carton retainer including a plurality of slot assemblies radially spaced apart, each slot assembly having a leading wall, a following wall and a base wall, each slot assembly structurally configured to retain a box therein. The first side carton folding assembly is structurally configured to fold a plurality of flaps of the box on a first side thereof. The second side carton folding assembly is structurally configured to fold a plurality of flaps of the box on a second side thereof. The axle extends between the first side and the second side of the frame spaced apart from the bottom of the frame, with the rotating carton retainer rotating about the axle.

In some configurations, the first and second sides are substantially parallel to each other, with the axle being perpendicular thereto.

In some configurations, the rotating carton retainer includes an inner plate and an outer plate spaced apart from the inner plate, with the slot assemblies being formed in the inner and outer plates.

In some configurations, the inner and outer plate define generally disk like configurations each defining an outer edge, with the leading wall, the following wall and the base wall of each of the slot assemblies spanning therebetween.

In some configurations, a lower guide is spaced apart from the rotating carton retainer and extending for at least a portion of a lower end of the inner and outer plates. In some configurations, at least a portion of a lower end of the inner and outer plates comprises approximately 180°.

In some configurations, the rotating carton retainer includes eight spaced apart slot assemblies defining eight stations.

In some configurations, the first side carton folding assembly is disposed on a front side of the rotating carton retainer further comprises a first trailing side flap fold arm, a first leading side flap folding surface, a first lower flap folding guide, a first upper flap folding guide and a first final folding surface.

In some configurations, the first trailing side flap fold arm comprises an axis of rotation wherein the distal end is configured to extend proximate the rotating carton retainer to contact and fold a first trailing side flap of the box.

In some configurations, the first flap leading side flap fold surface includes a leading edge and an inner surface, positioned in front of the rotating carton retainer, and structurally configured to contact and fold a first leading side flap of the box.

In some configurations, the first lower flap folding guide comprises a contact edge positioned in front of the rotating carton retainer, and structurally configured to contact and fold a lower flap of the box.

In some configurations, the first lower flap folding guide further includes a transition portion that extends from the contact edge and which is inclined toward the rotating carton retainer.

In some configurations, the first upper flap folding guide further includes a contact edge positioned in front of the rotating carton retainer, and structurally configured to contact and fold an upper flap of the box.

In some configurations, at least one glue actuator is positioned proximate at least one of the first lower flap folding guide and the first upper flap folding guide.

In some configurations, the second side carton folding assembly is disposed on a back side of the rotating carton retainer further comprises a second trailing side flap fold arm, a second leading side flap folding surface, a second lower flap folding guide, a second upper flap folding guide and a second final folding surface.

In some configurations, at least one glue actuator positioned proximate at least one of the second lower flap folding guide and the second upper flap folding guide.

In some configurations, the rotating carton retainer includes eight spaced apart slot assemblies defining eight stations; the first side carton folding assembly spans at least three stations; and the second side carton folding assembly spans at least three stations.

In some such configurations, the second side carton folding assembly initiates engagement with the box prior to the first side carton folding assembly.

In another aspect of the disclosure, the disclosure is directed to a method of box forming using the box forming carousel apparatus comprising the steps of: directing a box into a slot assembly of the plurality of slot assemblies at an eighth station; rotating the rotating carton retainer so that the box moves to a first station; inserting at least one can into the box at the first station; rotating the rotating carton retainer through at least the second station, third station, fourth station, fifth station and sixth station; sealing the plurality of flaps of the box on the first side thereof during the rotation from the first station through the sixth station; sealing the plurality of flaps of the box of the second side thereof during the rotation from the second station through the sixth station; rotating the box to a seventh station; and removing the box at the seventh station.

In another aspect of the disclosure, the disclosure is directed to a package forming system comprising a box forming carousel apparatus, a box loader, a can loader and an unloader. The box loader is structurally configured to direct boxes into at least one of the slot assemblies. The can loader is structurally configured to direct at least one can into a box that is positioned within at least one of the slot assemblies. The unloader is structurally configured to unload at least one package that includes a box and at least one can from at least one of the slot assemblies.

BRIEF DESCRIPTION OF THE DRAWINGS

The disclosure will now be described with reference to the drawings wherein.

DETAILED DESCRIPTION OF THE DISCLOSURE

Figure 1:
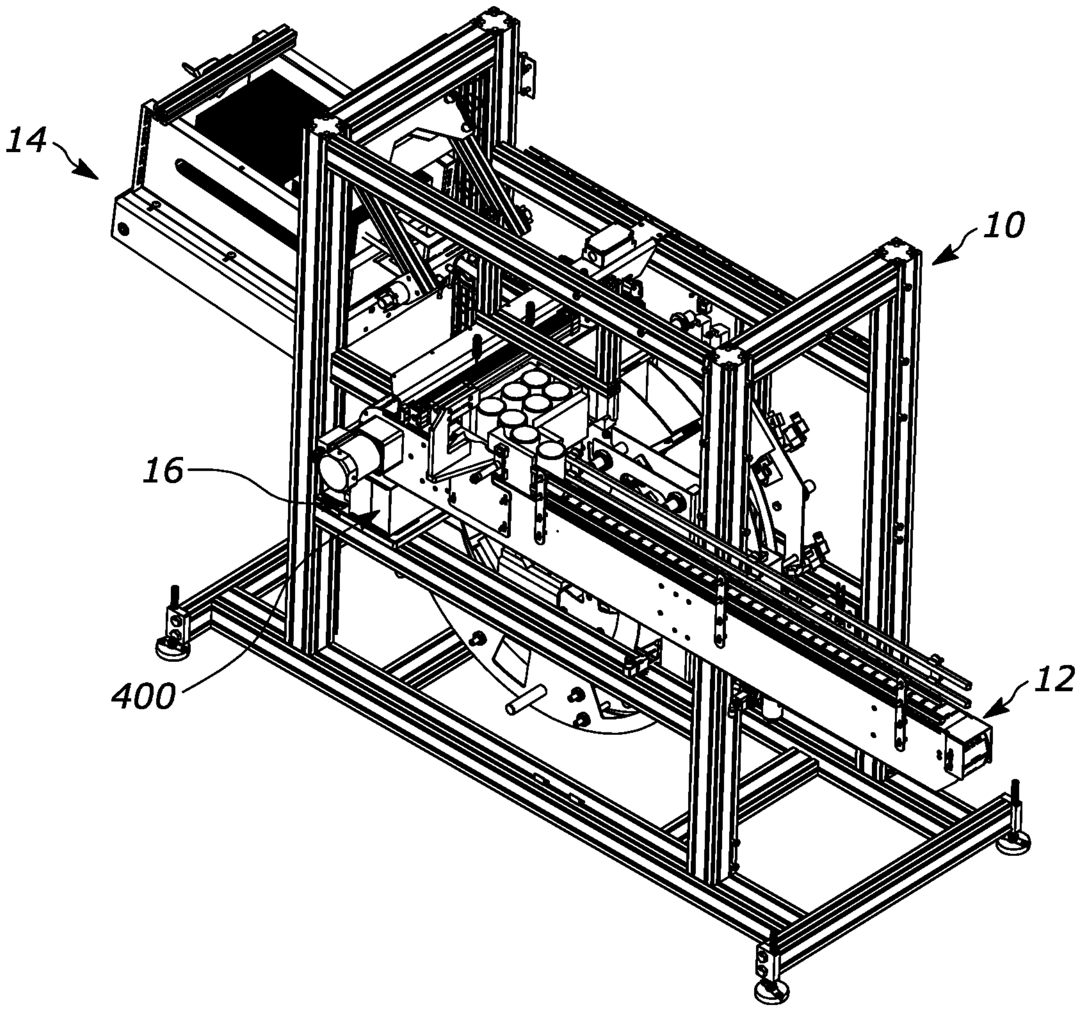
FIG. 1 of the drawings is a front perspective view of the package forming system of the present disclosure, showing the box forming carousel apparatus, the box loader, the can loader and the unloader.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

A need has been recognized within the boxing industry to service small beverage manufacturers, although this disclosure has application outside of beverage manufacturers. Although the package forming system disclosed herein, and shown in FIGS. 1 and 2 can be used to facilitate boxing of beverages, such as beers, ciders, wines, etc., stored within containers, such as cans, cartons and bottles (all of which will such containers will be referred to herein to as cans with the understanding that as used herein cans shall include cans, cartons and bottles), the box forming apparatus can be used for other types of boxed products, such as vegetables, soups, sauces, fruits, or any other type of product that a manufacturer desires to dispose within a box.

Figure 16:
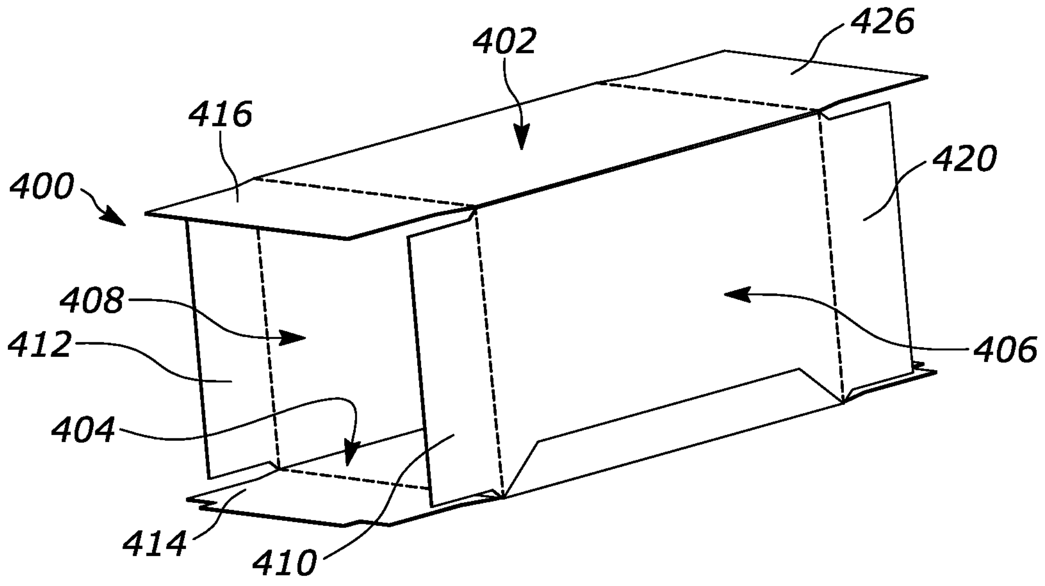
FIG. 16 of the drawings is a front elevational view of a box that can be filled by the system of the present disclosure.
Figure 17:
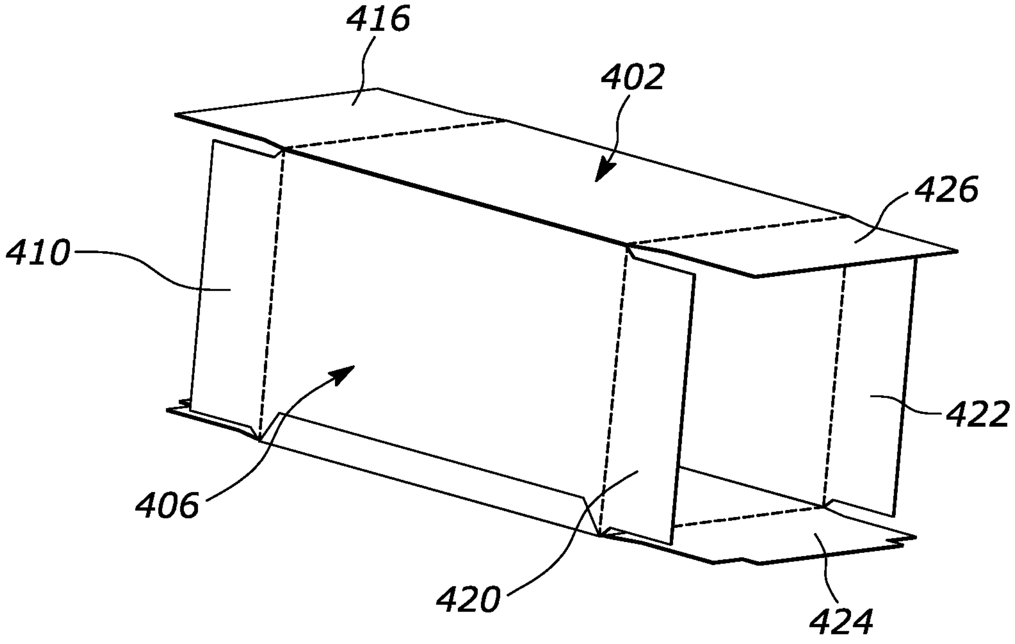
FIG. 17 of the drawings is a back elevational view of a box that can be filled by the system of the present disclosure.

An exemplary box 400 is shown in FIGS. 16 and 17 as comprising top wall 402, bottom wall 404, leading side wall 406 and trailing sidewall 408. The first end is formed through a cooperation between first side leading flap 410, first side trailing flap 412, first side lower flap 414 and first side upper flap 416. The second end is formed through a cooperation between second side leading flap 420, second side trailing flap 422, second side lower flap 424 and second side upper flap 426. Of course, other boxes are likewise contemplated.

Figure 2:
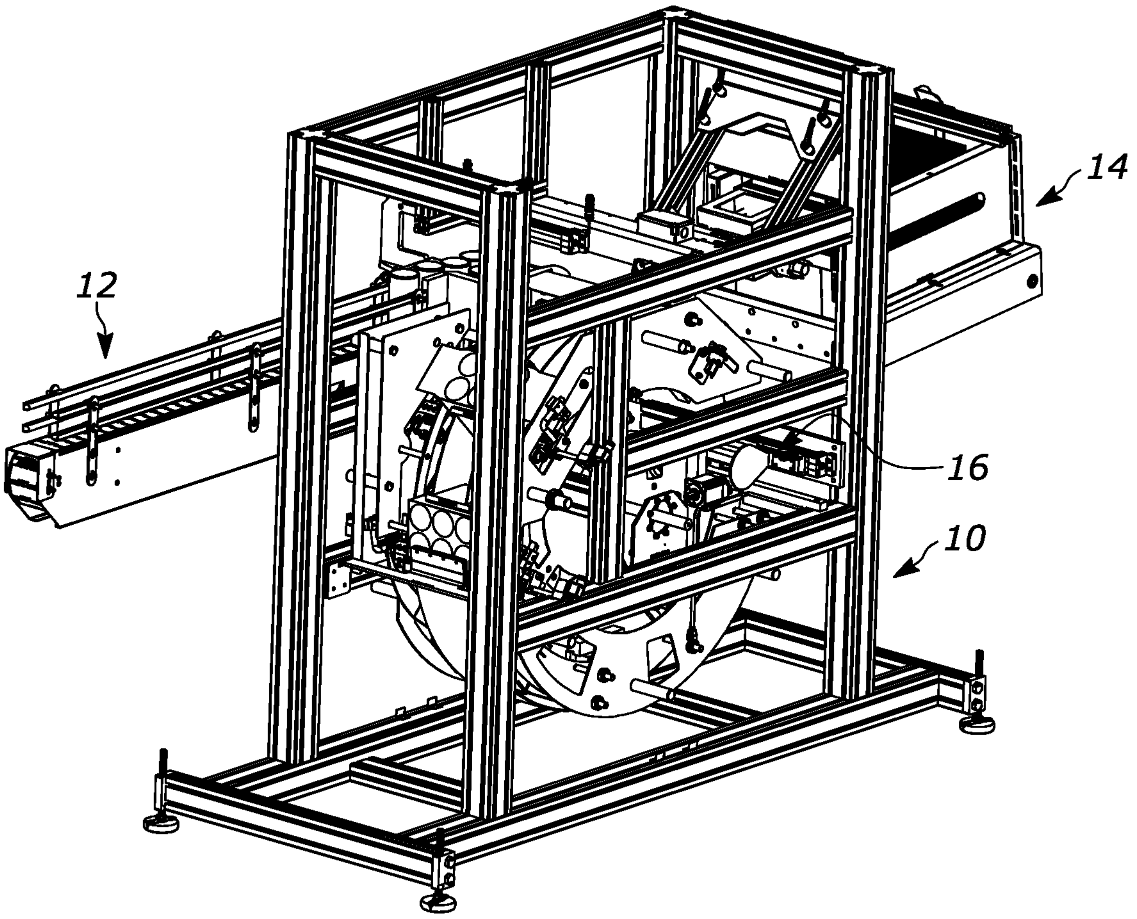
FIG. 2 of the drawings is a back perspective view of the package forming system of the present disclosure, showing the box forming carousel apparatus, the box loader, the can loader and the unloader.
Figure 3:
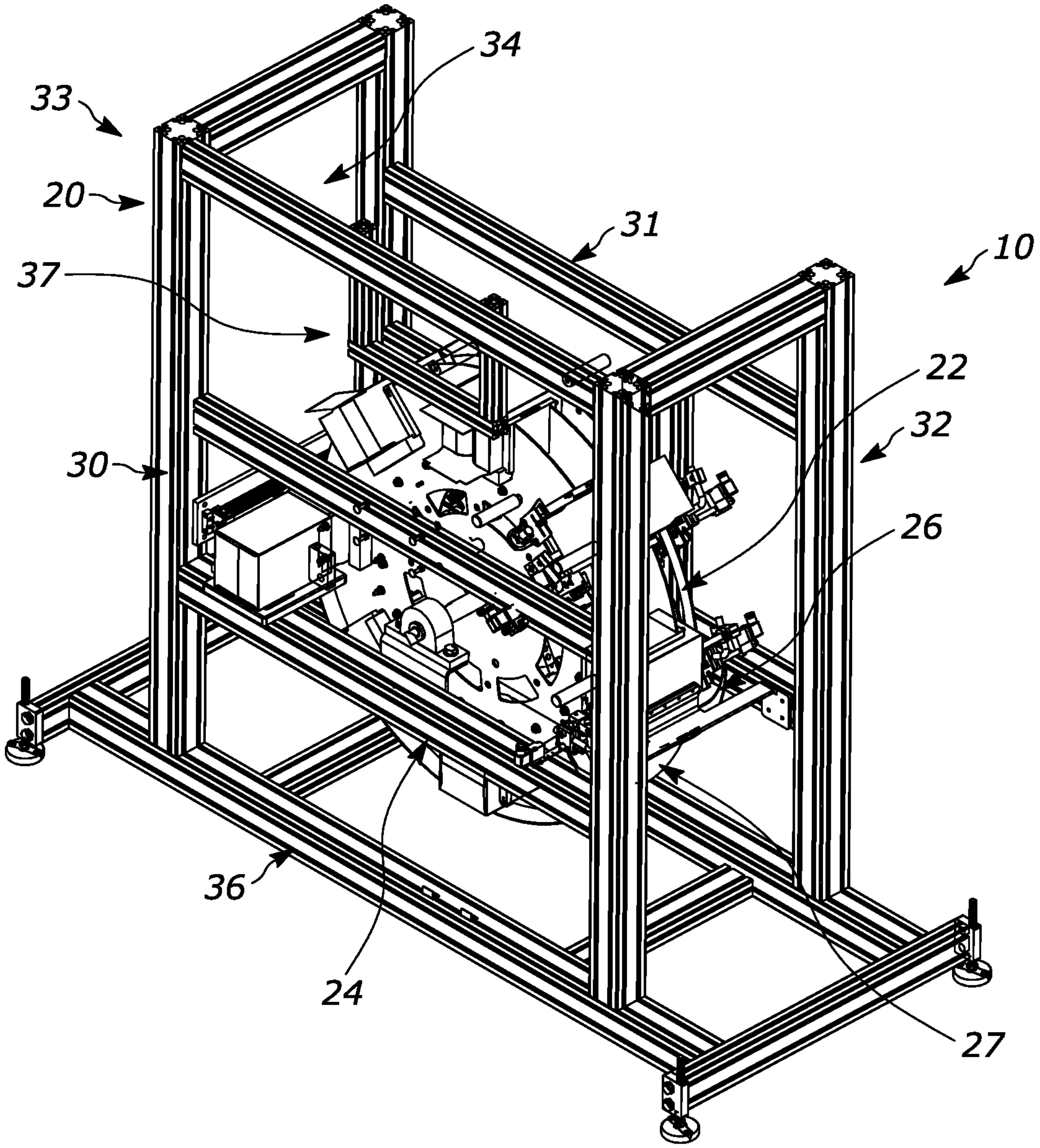
FIG. 3 of the drawings is a perspective view of the box forming carousel apparatus of the present disclosure.
Figure 4:
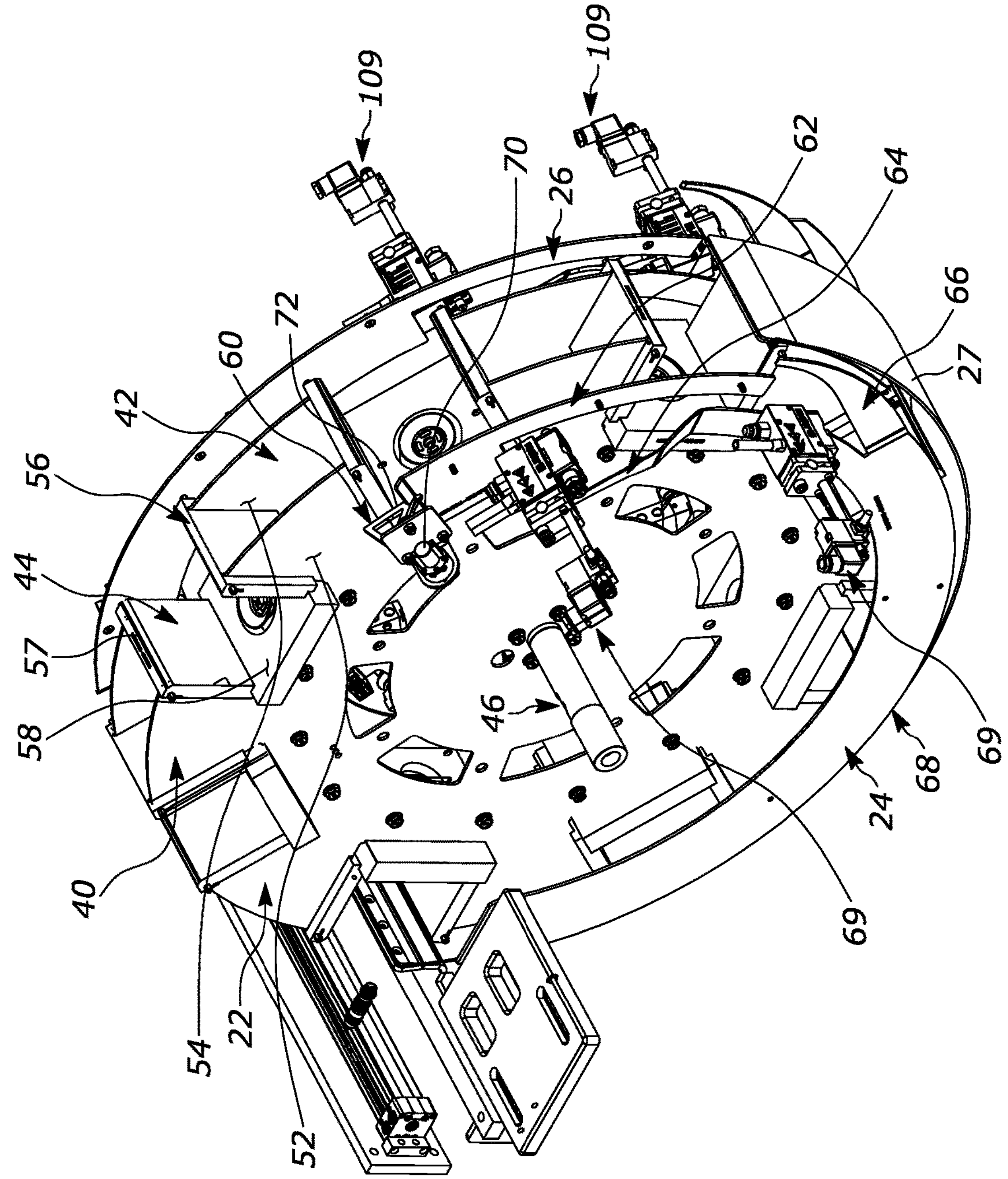
FIG. 4 of the drawings is a front perspective view of a portion of the box forming carousel apparatus of the present disclosure.

With reference to FIGS. 3, The box forming carousel apparatus is shown generally at 10. The apparatus 10 can be used to both fill a box with cans and then form and seal the box about the cans to retain the cans therein. With reference to FIGS. 1 and 2, the apparatus 10 can be used in conjunction with a can loader, such as can loader 12, a box loader, such as box loader 14, and a carousel unloader, such a carousel unloader 16 of form an overall package forming system (with the package being a box having cans positioned therein). It will be understood, and will be described hereinbelow, the types of can loaders, box loaders and carousel unloaders can be varied, while exemplary such loaders and unloaders will be described hereinbelow. It will be understood that such loaders and unloaders may be of different designs, and may likewise be manual or the like.

The apparatus 10 includes frame 20, rotating carton retainer 22, first side carton folding assembly 24, second side carton folding assembly 26 and lower outer guide 27. The frame 20 includes a plurality of beams, shelves and/or brackets which define a front 30, back 31, first side 32, second side 33, top 34 and bottom 36, collectively defining cavity 37. It will be understood that the frame may form the basis for the coupling of the can loader 12, the box loader 14 and the carousel 16 thereto.

With reference to FIGS. 4 through 10, the rotating carton retainer 22 is shown as comprising inner plate 40, outer plate 42, slot assemblies 44 and axle 46. The inner plate 40 comprises a disk-like configuration that includes an inner surface 50 and an outer surface 52, both terminating at an outer edge. The outer plate 42 comprises a disk-like configuration that includes inner surface 54 and outer surface 55, terminating at an outer edge. The inner and outer plates each include a plurality of corresponding radial slots spaced, preferably uniformly, about the circumference of the inner and outer plates.

Figure 6:
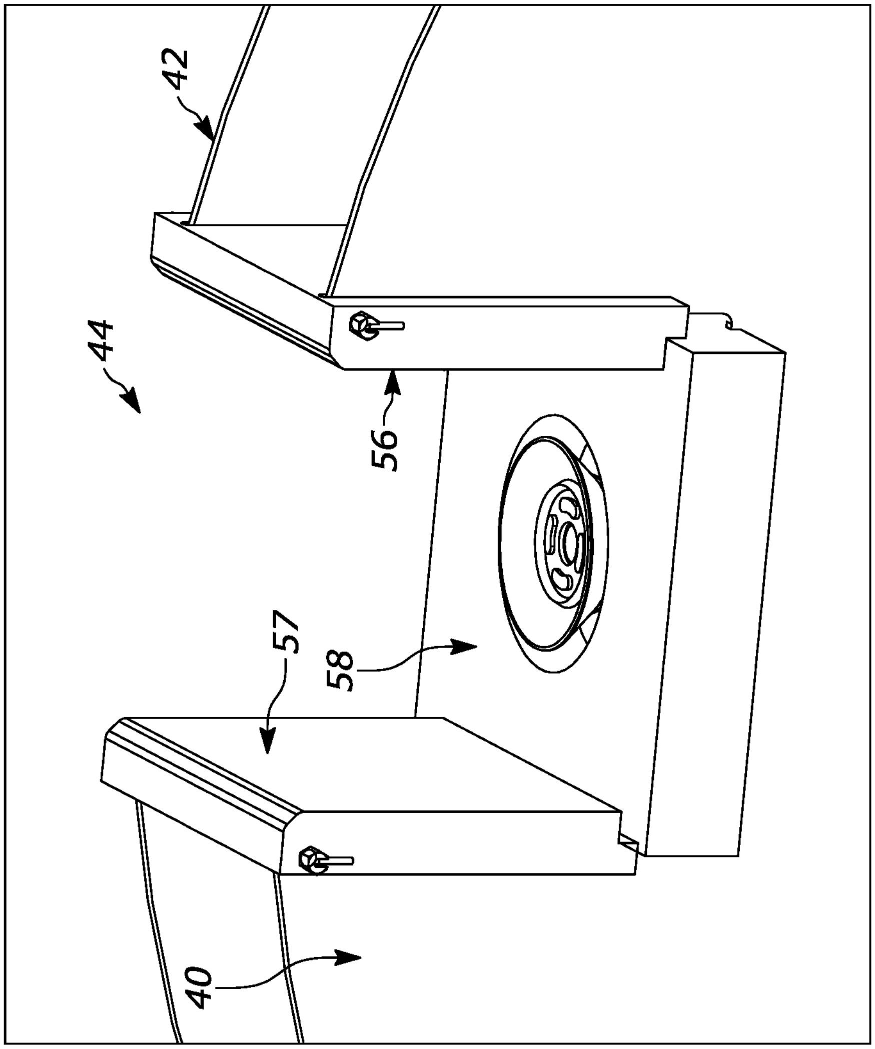
FIG. 6 of the drawings is a partial perspective view of the box forming apparatus of the present disclosure, showing in particular, a slot assembly of the rotating carton retainer.
Figure 7:
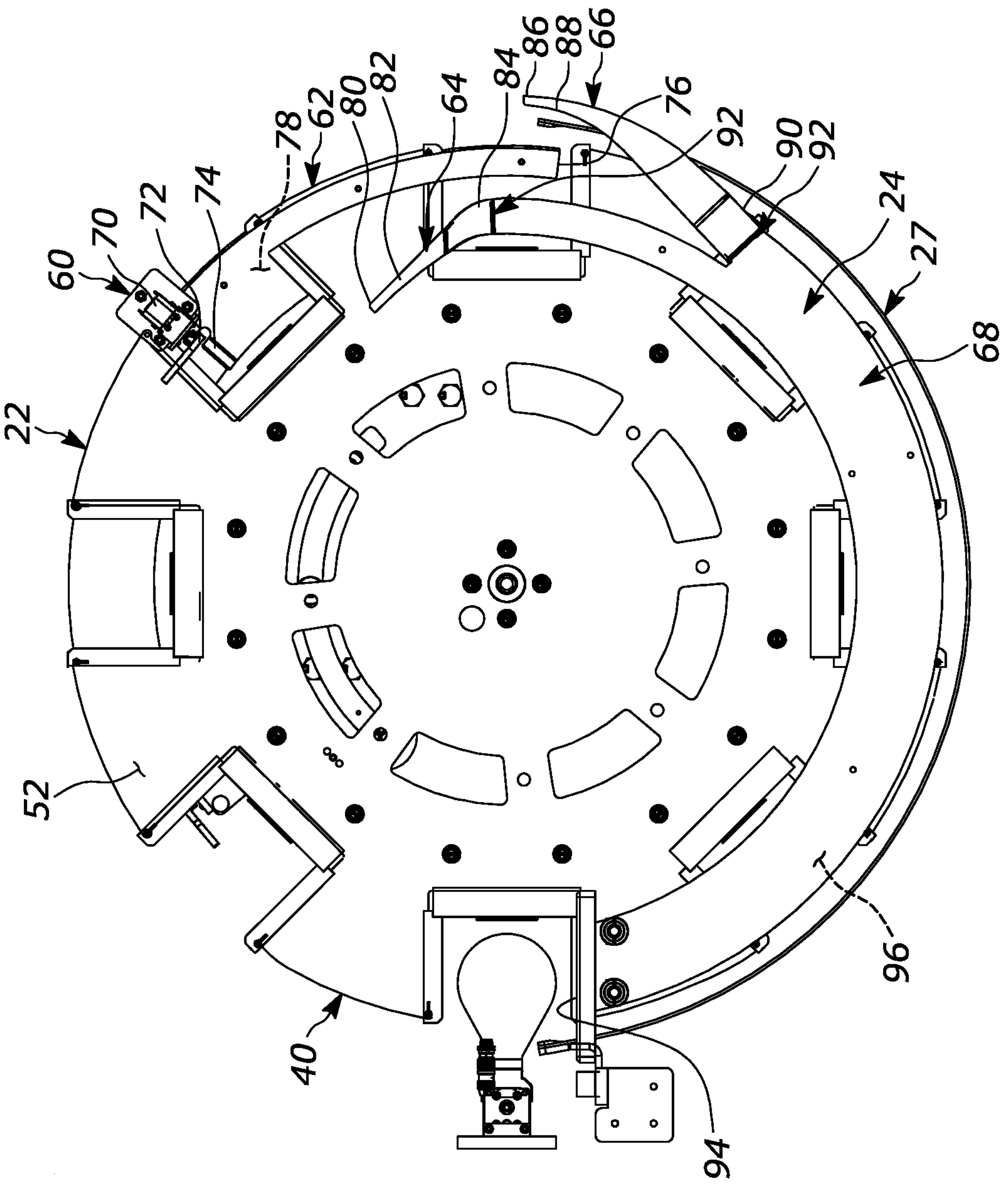
FIG. 7 of the drawings is a front elevational view of a portion of the box forming carousel apparatus, and the unloader, of the present disclosure.
Figure 8:
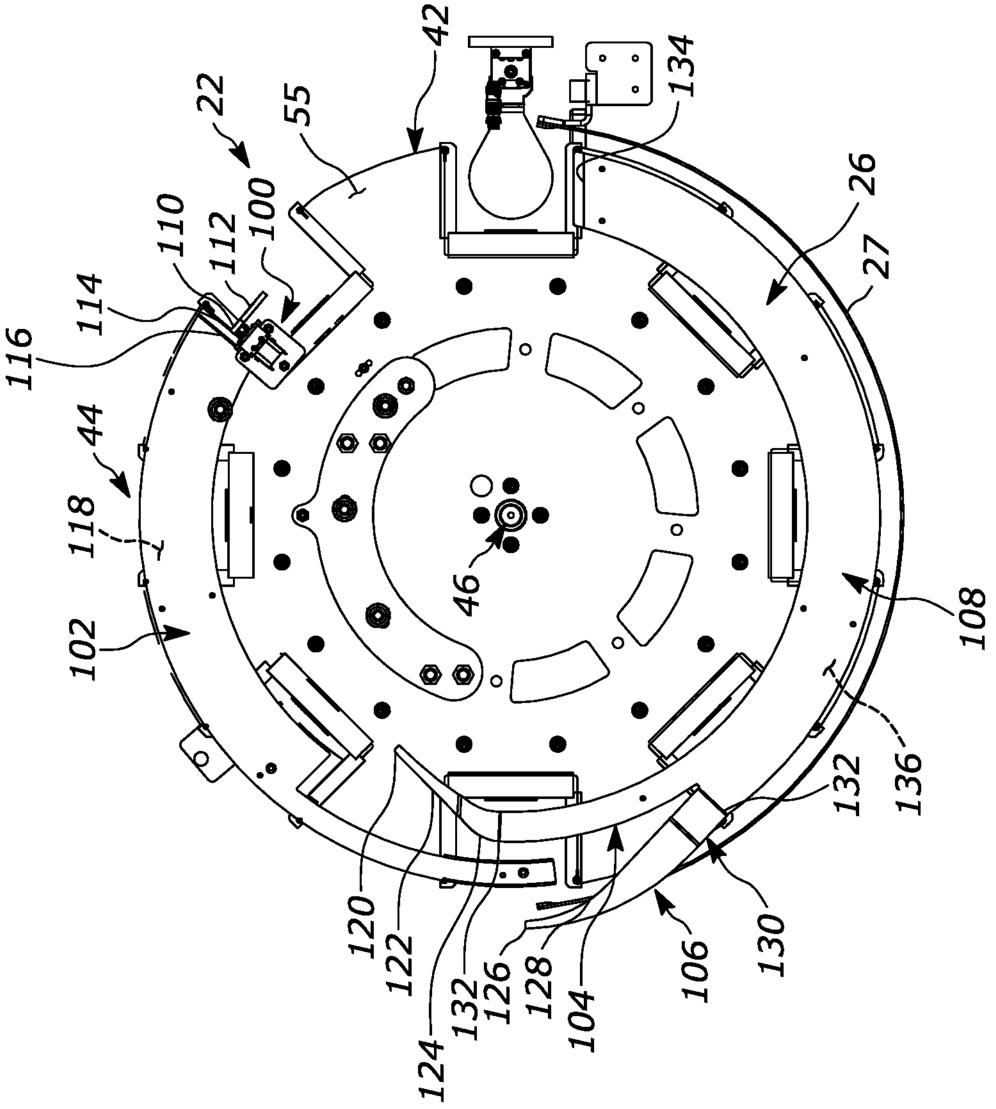
FIG. 8 of the drawings is a back elevational view of a portion of the box forming carousel apparatus, and the unloader, of the present disclosure.
Figure 9:
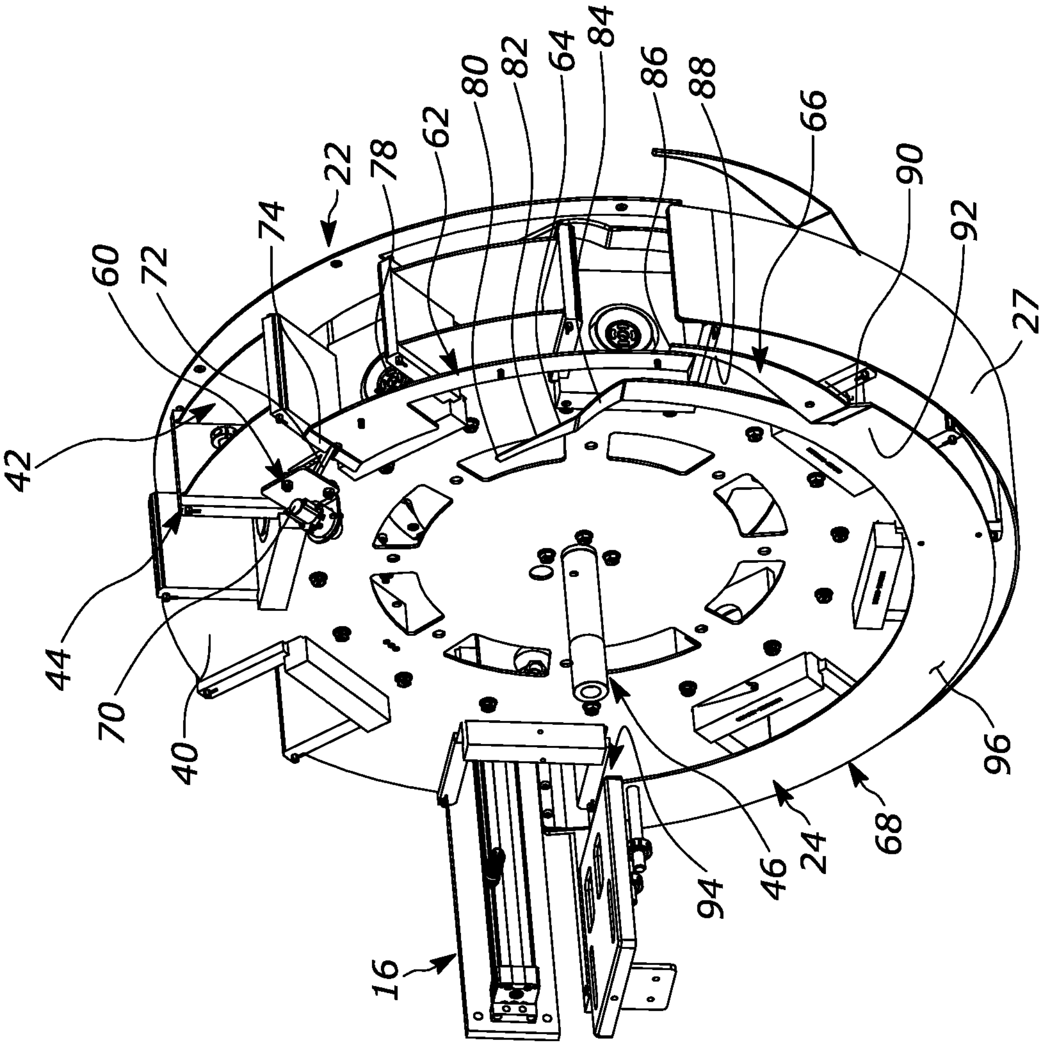
FIG. 9 of the drawings is a front perspective view of a portion of the box forming carousel apparatus, and the unloader, of the present disclosure.
Figure 10:
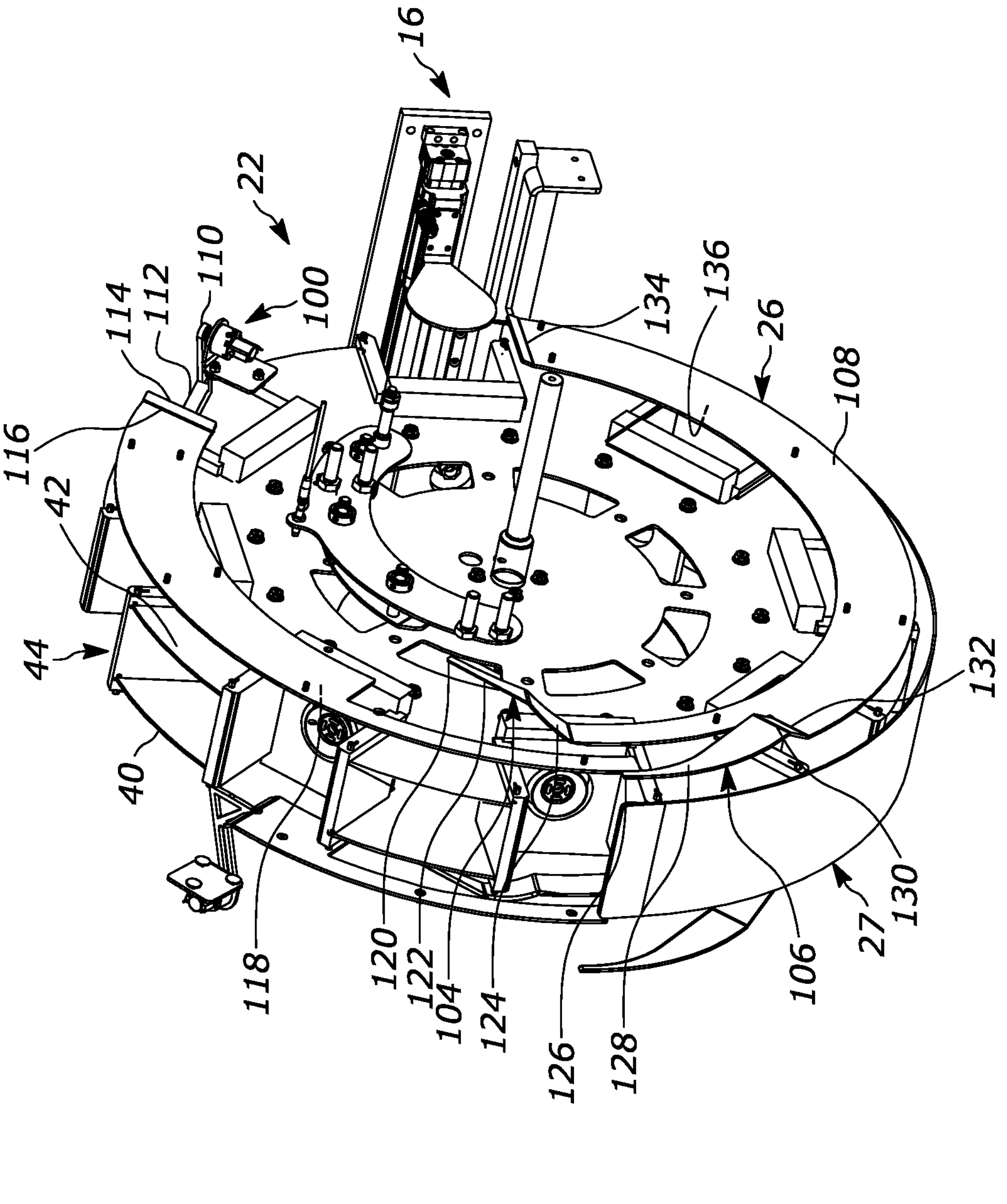
FIG. 10 of the drawings is a back perspective view of a portion of the box forming carousel apparatus, and the unloader, of the present disclosure.

With reference to FIG. 6, each slot assembly 44 is formed at each of the corresponding radial slots to include a leading wall 56, a following wall 57 and a base wall 58. In the configuration shown, the base wall (as well as the leading wall and/or the following wall) may include a vacuum suction system which further facilitates the proper orientation and maintenance of the box in at least one of the unfilled condition (i.e., stations eight and one, for example) and the filled condition (stations two through seven).

In the configuration shown in FIGS. 4, 5 and 7-10, eight slot assemblies are shown, with the understanding that in other configurations, a greater or lesser amount of slot assemblies may be utilized. The eight slot assemblies allow for a plurality of different functions to be performed on a box positioned within a slot assembly as the slot assembly makes a complete revolution about the axle 46. As the eight slot assemblies are uniformly positioned about the inner and outer plates, the respective slot assemblies are positioned at a spacing of 45° relative to adjacent slot assemblies.

The eight slot assemblies define eight stations, defined every 45° with the understanding that the rotating carton assembly, when looking from the front 30 of the frame 20, rotates in a clockwise direction. For purposes of this disclosure, the first station is defined at the uppermost position of the slot assembly, with each successive station being defined as station 2 through station 8, every 45°, in the clockwise direction.

Collectively, the leading wall 56, the following wall 57 and the base wall 58 together define a cross-sectional shape that corresponds to the shape of the box, with the understanding that the box may extend beyond the outer edges of the inner and outer plates. Furthermore, it will likewise be understood that the box may extend beyond the outer surface of each of the inner and outer plates as well.

In the configuration shown, the inner and outer plates are fixedly spaced relative to each other. However, it will be understood that in some configurations, the inner and outer plates may be adjustable relative to each other so as to be closer or further apart from each other. In such configurations the leading wall, the following wall and the base wall of each of the slot assemblies may be detachable with sets provided to match different spaced apart configurations of the inner and outer plates. In other configurations, one or more of the leading wall, the following wall and the base wall may be slidably mounted to one or both of the inner and outer plates (or to each other) so as to allow for relative movement of the inner and outer plates relative to each other to accommodate differently sized boxes. It will further be understood that the thickness of the leading wall, the following wall and the base wall can likewise provide some level of adjustability in the shape and configuration of the slot assemblies so as to accommodate differently sized and shaped boxes. That is, the walls of the slot assemblies can be removed and replaced (in, for example a kit format) so that the rotating carton retainer can accommodate different shapes and configurations of boxes.

The axle 46 is shown as being substantially horizontal, with the inner an outer plates being coupled thereto so as to rotate about the axle 46. The substantial horizontal configuration of the axle 46 (i.e., horizontal+/−15°) provides a relatively narrow apparatus with a relatively small footprint. In other configurations, the axle may be oblique to the ground, for example, and even perpendicular to the ground, while such configurations will require a greater footprint, typically. Additionally, the structure is configured so as to retain the boxes within the slot assemblies regardless of orientation (as will be explained below). A suitable motor (which may be coupled to the axle through a gear train, a belt and pulley system, or directly) can drive the axle (or the plates themselves) so as to rotate the plates and the slot assemblies about the axle 46. It will be understood that the system may be continuous or indexed for each of the stations, depending on the configuration desired, as well as the configuration of the loader and unloaders. In the configuration shown, the rotating carton retainer is configured to rotate about the axle in an indexed fashion so that a single box undergoes eight separate steps (while the number of steps and indexes can be varied, depending on the configuration).

The first side carton folding assembly 24 is shown as comprising first trailing side flap fold arm 60, first leading side flap folding surface 62, first lower flap folding guide 64, first upper flap folding guide 66 and first final folding surface 68. The first side carton folding assembly 24 is positioned within the frame outboard of the inner plate 40. The first trailing side flap fold arm 60 is pivotably coupled to the frame proximate the first slot assembly, and includes an axis of rotation and a distal end 72. It will be understood that the first trailing side flap fold arm 60 is configured to pivot about the axis of rotation 70 from a first position that is spaced apart from the inner plate to a second position that is proximate the leading end 74 of the first leading side flap fold surface 62. It will be explained below, that the function of the first trailing side flap fold arm 60 is to inwardly fold the trailing side flap of the box as the box is traveling from the first station to the second station, so as to be properly positioned when reaching the leading end 74 of the first leading side flap fold surface 62.

The first leading side flap folding surface 62 is shown as including the leading end 74, a distal end 76 and an inner surface 78. The first leading side flap folding surface 62 is configured to fold the leading flap into a sealed orientation. The inner surface 78 continues for an arcuate distance encompassing the portions of the second and the third stations, so as to maintain the leading and trailing side flaps in the folded configuration. It will be understood that glue actuators 109 may be utilized so as to apply an glue to the outer surface of the leading and trailing side flaps while these are retained in the folded configuration by the first leading side flap folding surface, as the inner surface 78 covers only a portion of the side flaps. In some configurations, the glue actuator 109 may apply glue to the lower and upper flaps prior to folding these flaps over the leading and trailing side flaps. In the configuration shown, a pair of glue actuators 109 are provided, one proximate the second station, and one proximate the third station.

The first lower flap folding guide 64 is shown as comprising a leading end 80, a contact edge 82 and a transition portion 84. The first lower flap folding guide 64 engages the lower flap on its outer surface and/or leading edge and through the contact edge 82 and the transition portion 84 (which is inwardly directed) folds and urges the lower flap into contact with the leading and trailing side flaps that have already been folded. With glue being disposed therebetween, the flap contact joins the lower flap to the leading and trailing side flaps. The first lower flap folding guide meets the final folding surface 68 after the transition portion 84, at the leading end 92 thereof. It will be understood that the folding and adhesion of the first lower flap initially occurs between the second and third or fourth stations, with the contact being maintained with the inner surface 96 of the first final folding surface 68 through to the eighth station.

The first upper flap folding guide 66 includes leading end 86, contact edge 88 and transition portion 90. As with the first lower flap folding guide, the first upper flap folding guide 66 engages the upper flap on its outer surface and/or leading edge and through the contact edge 88 and the transition portion 90 (which is inwardly directed) folds and urges the upper flap into contact with the leading and trailing side flaps that have already been folded (and also with the lower flap in some configurations which has likewise been folded). With glue being disposed therebetween the flap contact joins the upper flap to the leading and trailing side flaps (and optionally the lower flap), the first upper flap folding guide meets the first final folding surface 68 after the transition portion 90, at the leading end thereof 92.

Whereas the lower flap meets the leading end 92 proximate the third station, the upper flap meets the leading end 92 proximate the fourth station. The contact is maintained between the upper flap and the inner surface 96 of the first final folding surface 68 through to the eighth station.

It will be understood that the configuration of the first leading side flap folding surface, and the first lower and upper flap folding guides, taller and shorter boxes can be accommodated. Furthermore, it will be understood that the position of the components of the first side carton folding assembly can be directed toward or away from the inner plate so as to accommodate differently sized boxes.

The second side carton folding assembly 26 is shown as comprising second trailing side flap fold arm 100, second leading side flap folding surface 102, second lower flap folding guide 104, second upper flap folding guide 106 and second final folding surface 108. The second side carton folding assembly is in many respects a mirror image of the first side carton folding assembly, as for many boxes, the opposing ends are substantially identical, and, therefore closure of the box is generally the same on the opposing sides. Among other differences, the folding of the second leading flap and the second trailing flap happens proximate the eighth station, and, as a result, the inner surface 118 of the second leading side flap fold surface is longer than the corresponding structure, the inner surface 78, of the first leading side flap folding surface. And, the first trailing side flap fold arm is likewise positioned proximate the eighth station.

In greater detail, the second side carton folding assembly 26 is positioned within the frame outboard of the inner plate 40. The first trailing side flap fold arm 60 is pivotably coupled to the frame proximate the second slot assembly, and includes an axis of rotation and a distal end 112. It will be understood that the second trailing side flap fold arm 100 is configured to pivot about the axis of rotation 110 from a first position that is spaced apart from the inner plate to a second position that is proximate the leading end 114 of the second leading side flap fold surface 102. It will be explained below, that the function of the second trailing side flap fold arm 100 is to inwardly fold the trailing side flap of the box as the box is traveling from the first station to the second station, so as to be properly positioned when reaching the leading end 114 of the second leading side flap fold surface 102.

The second leading side flap folding surface 102 is shown as including the leading end 114, a distal end 116 and an inner surface 118. The second leading side flap folding surface 102 is configured to fold the leading flap into a sealed orientation. The inner surface 118 continues for an arcuate distance encompassing the portions of the second and the third stations, so as to maintain the leading and trailing side flaps in the folded configuration. It will be understood that glue actuators may be utilized so as to apply a glue to the outer surface of the leading and trailing side flaps while these are retained in the folded configuration by the second leading side flap folding surface, as the inner surface 118 covers only a portion of the side flaps. In some configurations, the flue actuator may apply glue to the lower and upper flaps prior to folding these flaps over the leading and trailing side flaps. In the configuration shown, a pair of glue actuators are provided, one proximate the second station, and one proximate the third station.

The second lower flap folding guide 104 is shown as comprising a leading end 120, a contact edge 122 and a transition portion 124. The second lower flap folding guide 104 engages the lower flap on its outer surface and/or leading edge and through the contact edge 122 and the transition portion 124 (which is inwardly directed) folds and urges the lower flap into contact with the leading and trailing side flaps that have already been folded. With glue being disposed therebetween, the flap contact joins the lower flap to the leading and trailing side flaps. The second lower flap folding guide meets the second final folding surface 108 after the transition portion 124, at the leading end 132 thereof. It will be understood that the folding and adhesion of the second lower flap initially occurs between the second and third or fourth stations, with the contact being maintained with the inner surface 136 of the first final folding surface 108 through to the eighth station.

The second upper flap folding guide 106 includes leading end 126, contact edge 128 and transition portion 130. As with the second lower flap folding guide, the second upper flap folding guide 106 engages the upper flap on its outer surface and/or leading edge and through the contact edge 128 and the transition portion 130 (which is inwardly directed) folds and urges the upper flap into contact with the leading and trailing side flaps that have already been folded (and also with the lower flap in some configurations which has likewise been folded). With glue being disposed therebetween the flap contact joins the upper flap to the leading and trailing side flaps (and optionally the lower flap), the first upper flap folding guide meets the second final folding surface 108 after the transition portion 130, at the leading end thereof 132.

Whereas the lower flap meets the leading end 132 proximate the third station, the upper flap meets the leading end 132 proximate the fourth station. The contact is maintained between the upper flap and the inner surface 136 of the second final folding surface 108 through to the eighth station.

It will be understood that the configuration of the second leading side flap folding surface, and the second lower and upper flap folding guides, taller and shorter boxes can be accommodated. Furthermore, it will be understood that the position of the components of the second side carton folding assembly can be directed toward or away from the outer plate so as to accommodate differently sized boxes.

The lower outer guide 27 comprises an arcuate panel spaced apart spaced apart from the inner and outer plates 40, 42 and generally follows the arcuate path of the outer edges thereof. In the configuration shown, the arcuate configuration extends about the lower approximately 180° of rotation, and encompasses between the end of station three to the start of station 7. It is contemplated that the arcuate configuration can be modified, so as to facilitate use with differently sized and dimensioned boxes. In other configurations, rollers rails, or other structures may be used in place of a surface to minimize contact.

The operation will be discussed in the context of the formation of a single box and filling thereof with cans. It will be understood that the process is continuing with subsequent blanks and cans being introduced at every indexing of the rotating carton retainer.

More specifically, in operation, boxes can be provided to the apparatus in a flat, partially assembled blank configuration. The boxes can be fed with the box loader into the eighth station. In some configurations, the box loader may comprise an automated assembly, whereas in other configurations, the box loader may comprise a manual operation of articulating a partially assembled blank into the eighth station.

At or near the same time (while both subsequently and previously are likewise contemplated), the desired number of cans can be prepared for insertion into the box. The rotating carton retainer is indexed so that the introduced box is now at the first station (positioned in the present configuration at the top of the rotation of the rotating carton retainer).

As the rotating carton retainer rotates moving the carton to the first station, the second trailing side flap fold arm is actuated to rotate and inwardly move (i.e., fold) the second trailing side flap so as to be folded by the time that the second trailing side flap reaches the leading edge 114 of the second leading side flap fold surface 102.

As the rotation starts of the rotating carton retainer, the second leading side flap contacts the leading end of the second leading side flap fold surface 102 inwardly folding the second leading side flap. By the time that the box reaches the first station, both the second leading side flap and the second trailing side flap have been folded, and are precluded from unfolding by contact with the inner surface 118 of the second leading side flap folding surface 122.

At the first station, the box has been articulated, the second leading side flap and the second trailing side flap have been folded. While in the first station, the cans are introduced into the box. The cans are pushed into the box through the can loader 12 which can loader may comprise automated equipment or which may comprise manual loading. As the cans are pushed into the box, the position of the inner surface 118 of the second leading side flap fold surface precludes the cans from pushing the second leading side flap and the second trailing side flap, and falling out of the box.

Once the cans have been loaded, the rotating carton retainer is rotated, moving the box from the first station to the second station. During the rotation, the first trailing side flap is folded by the actuation and rotation of the first trailing side flap fold arm 60. And, the first leading side flap is folded through contact with the leading edge 74 of the first leading side flap fold surface. By the time that the first trailing side flap reaches the first leading side flap fold surface 62, the first trailing side flap is folded (as is the leading side flap), and the folded configuration is maintained by the inner surface 78.

The rotating carton retainer is again rotated, moving the box from the second station to the third station. During rotation, glue is applied to the outer surfaces of all four of the flaps that have been folded (i.e., the first leading side flap, the first trailing side flap, the second leading side flap and the second trailing side flap) by glue applicators (in the configuration shown, proximate a region that will be overlayed with the first and second lower flaps).

On the first side, the first leading side flap and the first trailing side flap are maintained in the folded configuration by the inner surface of the first leading side flap fold surface. At the same time, the first lower flap is directed into contact with the leading end 80 and the contact edge 82 and then the transition portion 84 of the first lower flap folding guide 64 which collectively engage, urge, inwardly direct and fold the first lower flap against the outer surface of the first leading side flap and the first trailing side flap (squeezing the glue therebetween and gluing these flaps together). The first lower flap remains pushed against the first leading side flap and the first trailing side flap by inner surface 96 of the first final folding surface 68.

On the second side, the second leading side flap and the second trailing side flap are maintained in the folded configuration by the inner surface of the second leading side flap fold surface. At the same time, the second lower flap is directed into contact with the leading end 120 and the contact edge 122 and then the transition portion 124 of the second lower flap folding guide 104 which collectively engage, urge, inwardly direct and fold the second lower flap against the outer surface of the second leading side flap and the second trailing side flap (squeezing the glue therebetween and gluing these flaps together). The second lower flap remains pushed against the second leading side flap and the second trailing side flap by inner surface 136 of the second final folding surface 108.

By this stage, six of the eight flaps have been assembled into the desired orientation and they have been glued together. The rotating carton retainer is again rotated, moving the box from the third station to the fourth station. During rotation, glue is applied to the outer surface of the four initially folded flaps (namely, the first leading side flap, the first trailing side flap, the second leading side flap and the second trailing side flap) proximate the region where the upper flaps would overlie. At this time, in some configurations where the upper flap and the lower flap overlap, glue may be applied to the outer surface of the respective lower flaps.

On the first side, the first leading side flap, the first trailing side flap and the first lower flap are maintained in the folded configuration by the inner surface 96 of the first final folding surface 68. At the same time, the first upper flap is directed into contact with the leading end 86 and the contact edge 88 and then the transition portion 90 of the first upper flap folding guide 66 which collectively engage, urge, inwardly direct and fold the first upper flap against the outer surface of the first leading side flap, the first trailing side flap and in some configurations the outer surface of the first lower flap (squeezing the glue therebetween and gluing these flaps together). All of the flaps remain pushed against each other by the inner surface 96 of the first final folding surface 68 which is reached as the box reaches the fourth station.

On the second side, the second leading side flap, the second trailing side flap and the second lower flap are maintained in the folded configuration by the inner surface 136 of the second final folding surface 108. At the same time, the second upper flap is directed into contact with the leading end 126 and the contact edge 128 and then the transition portion 130 of the second upper flap folding guide 106 which collectively engage, urge, inwardly direct and fold the second upper flap against the outer surface of the second leading side flap, the second trailing side flap and in some configurations the outer surface of the second lower flap (squeezing the glue therebetween and gluing these flaps together). All of the flaps remain pushed against each other by the inner surface 136 of the first final folding surface 108 which is reached as the box reaches the fourth station.

As the rotating carton is rotated directing the box from the fourth station to the fifth station and sixth stations, the respective flaps on either side remain folded due to the inner surface 96 of the first final folding surface 68 on the first side and the inner surface 136 of the second final folding surface 108 on the second side.

As the rotating carton reaches the seventh station, the box passes beyond the trailing end 94 of the first final folding surface 68 and beyond the trailing end 134 of the second final folding surface 108. The flaps have been glued together and the box has been formed and sealed with the cans placed within the box forming the finished package.

At the seventh station, the carousel unloader 16 is activated to push the completed package out of the respective slot assembly and the rotating carton retainer 22. In the configuration shown, the carousel unloader pushes the package beyond the inner plate onto a surface. In other configurations, the carousel unloader can push the package beyond the outer plate onto a surface. In some configurations, the package may be rotated, pivoted along various axes as the package exits from the rotating carton retainer.

With the emptied slot assembly at station seven, the rotating carton retainer 22 is again rotated to station eight. At the eighth station, another partially assembled box blank is articulated and introduced into the slot assembly by the box loader 12, initiating another cycle. It will be understood that during operation boxes or processes are occurring at each of the stations and between at least some of the stations as boxes and/or boxes and cartons and/or completed packages are located in each of the slot assemblies.

Figure 11:
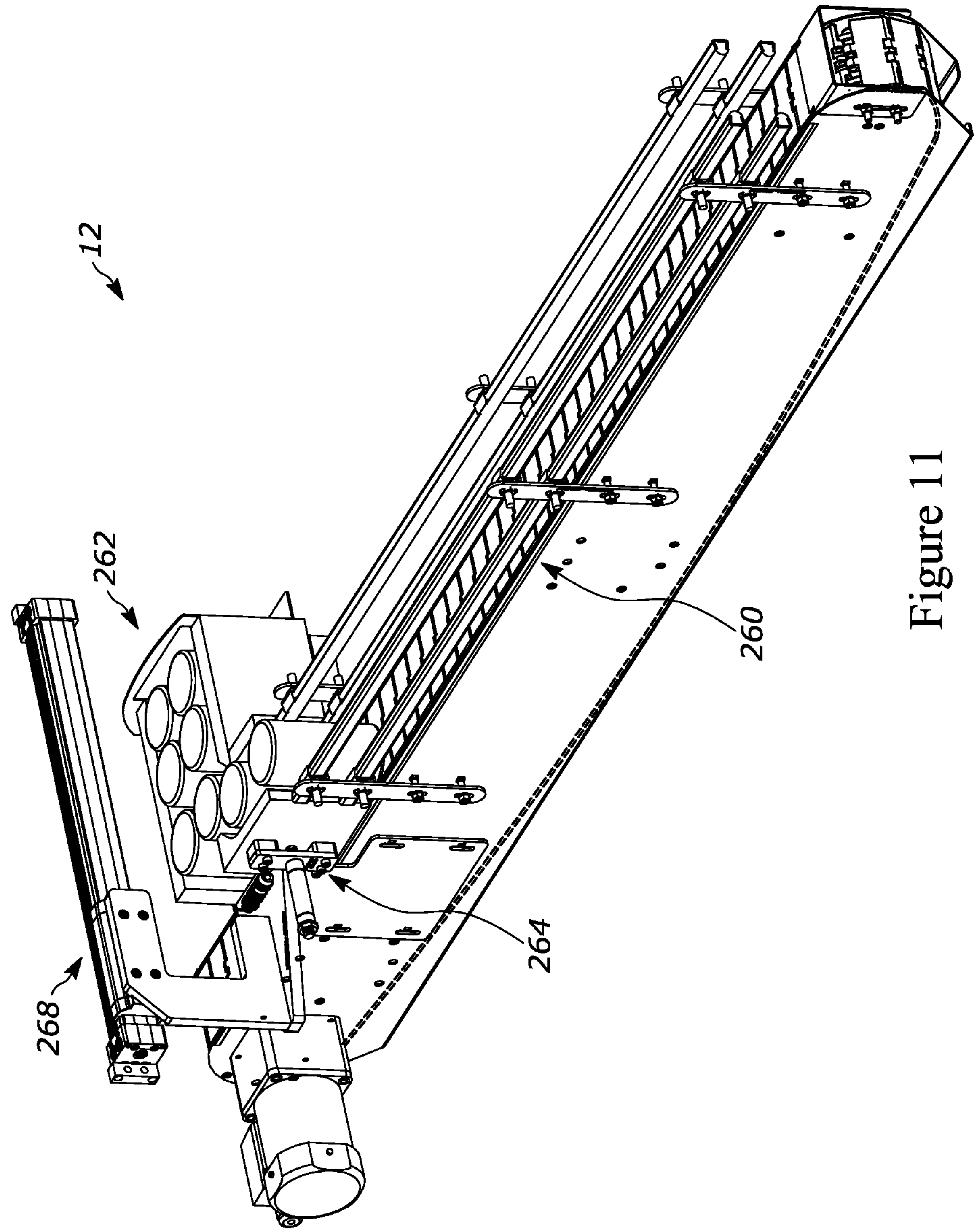
FIG. 11 of the drawings is a perspective view of the can loader of the system of the present disclosure.
Figure 12:
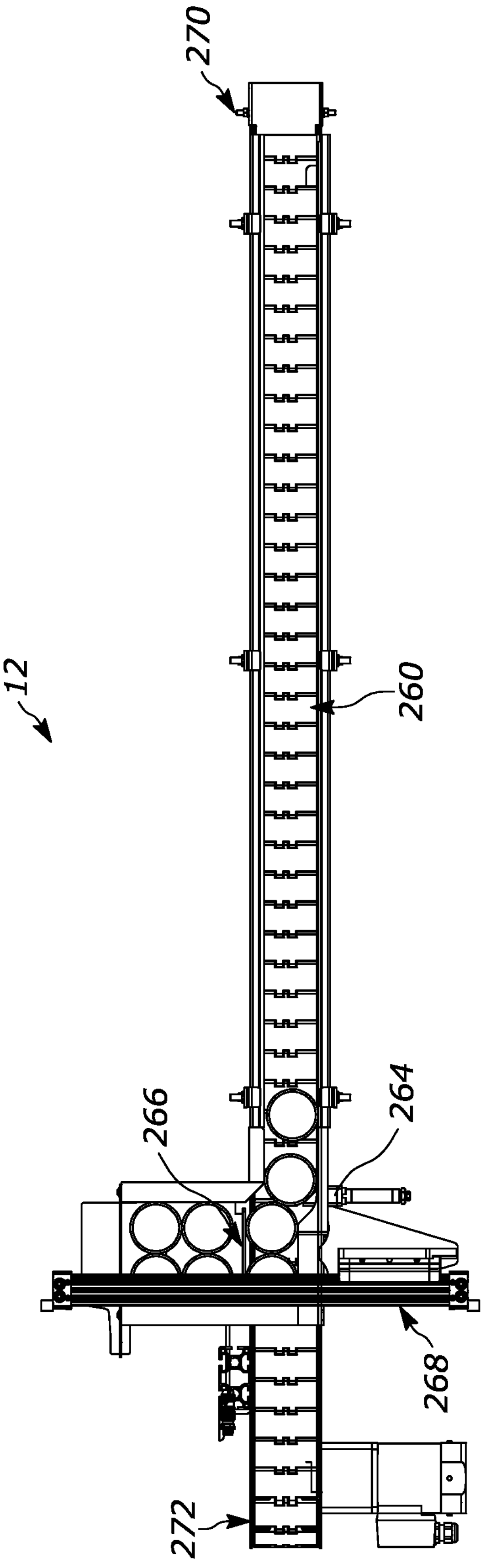
FIG. 12 of the drawings is a top plan view of the can loader of the system of the present disclosure.
Figure 13:
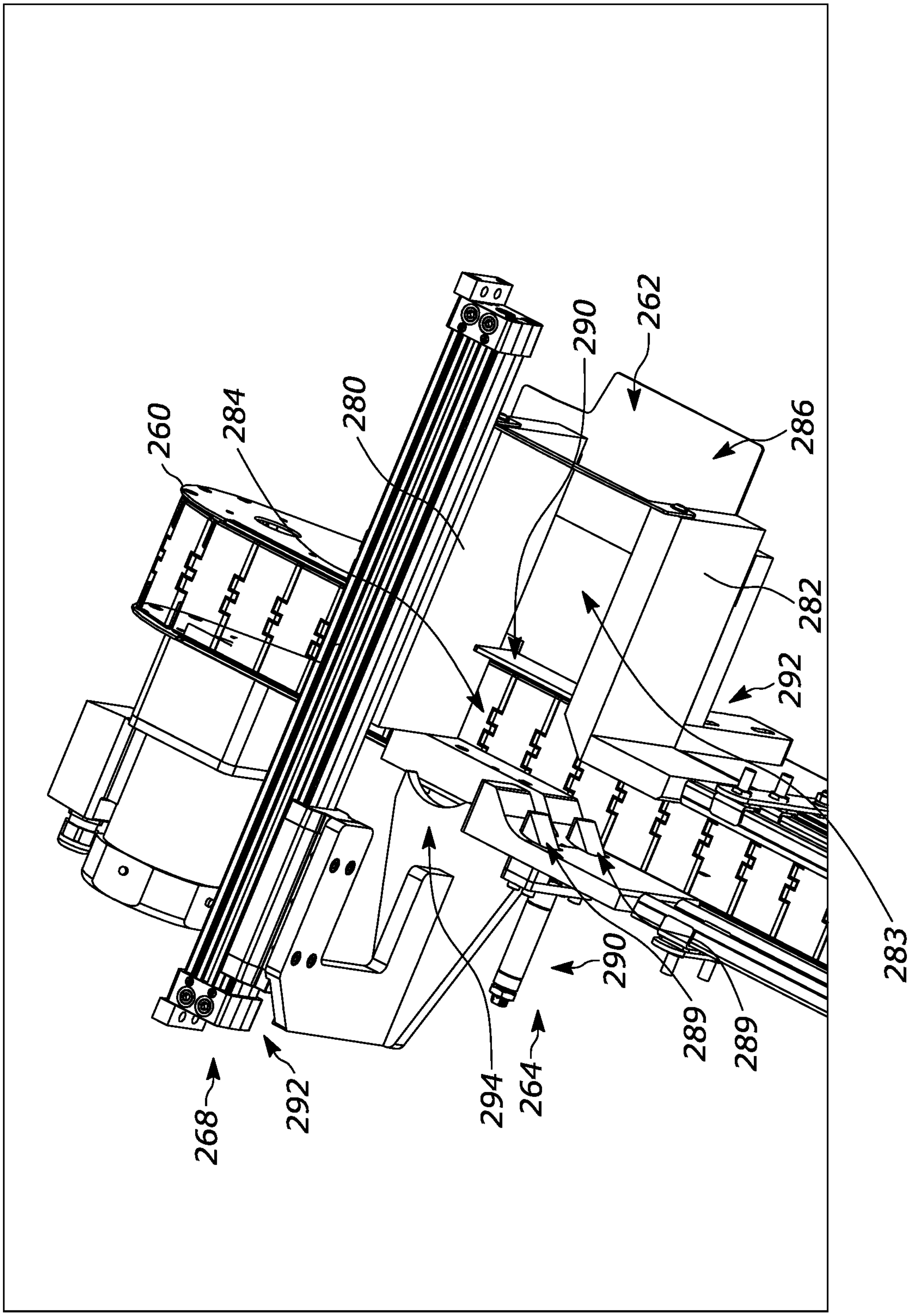
FIG. 13 of the drawings is a partial perspective view of the can loader of the system of the present disclosure.
Figure 14:
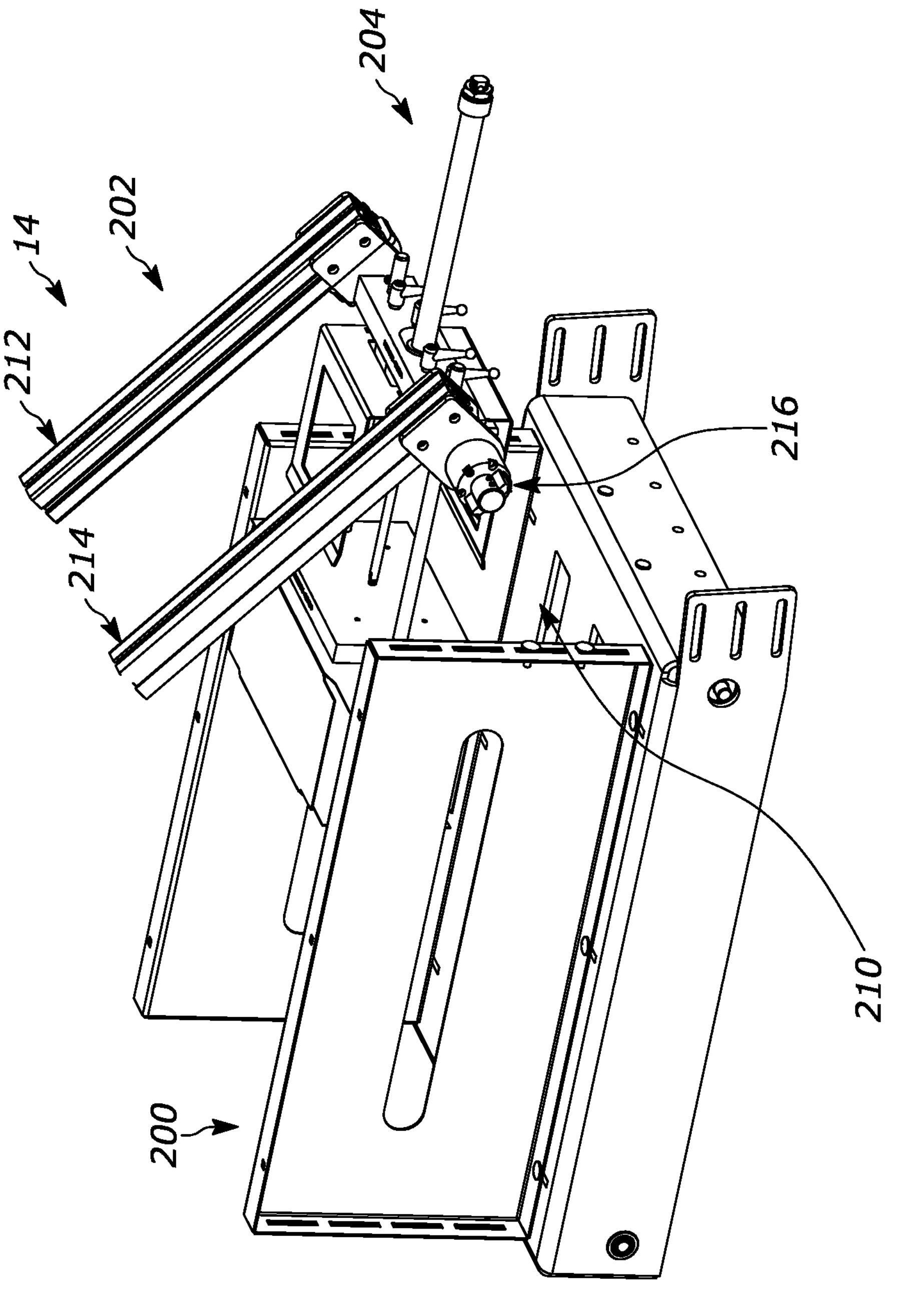
FIG. 14 of the drawings is a perspective view of the box loader of the system of the present disclosure.
Figure 15:
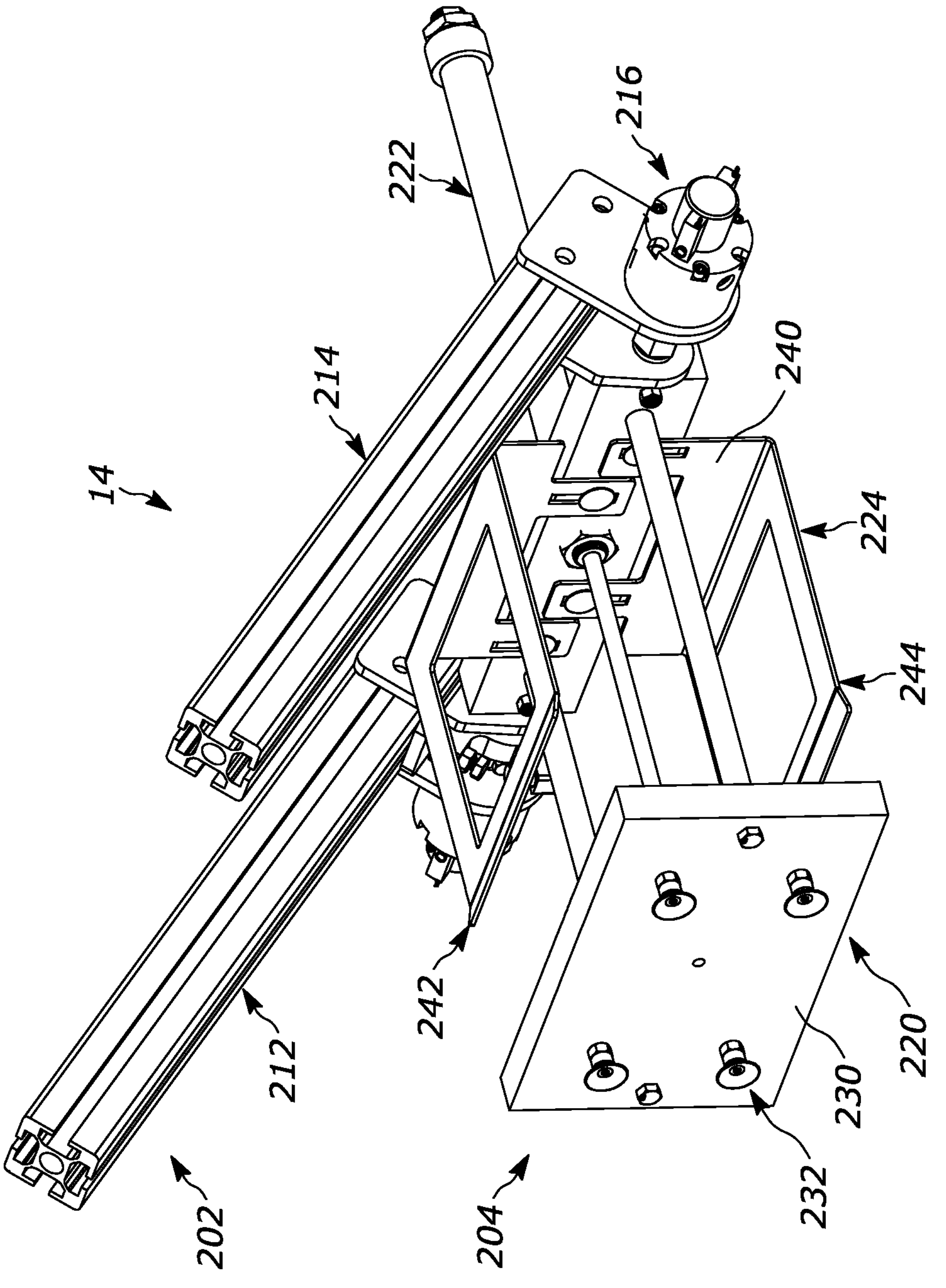
FIG. 15 of the drawings is a perspective view of a portion of the box loader of the system of the present disclosure.

With reference to FIGS. 11 through 13, as set forth above, the can loader 12 may comprise a manual operation wherein an operator can provide cans into the box at the first station. In another configuration, the can loader 12 may comprise a conveyor 260, a pre loading region 262, blocking gate 264, floor gate 266 and engaging arm assembly 268. The conveyor 260 includes first end 270 and second end 272. So as to minimize the footprint of the overall apparatus, the conveyor can be substantially parallel to the inner and outer plates so as to extend along the front of the frame 20 (to which the can loader can be attached). It will also be understood that the conveyor may be fed by the outlet of a filler, for example.

The pre loading region 262 is positioned between the first and second end of the conveyor, positioned outside of the inner plate 40 and aligned with the slot assembly when in a first station. The preloading region 262 includes a distal wall 280 and proximal wall 282 that are spaced apart to correspond with the loading wall and the following wall, and a base wall 283 which corresponds to the conveyor at a conveyor side and to the base wall 58 of the slot assembly of the rotating carton retainer at the box side 286. The distal wall 280 extends over at least a portion of the conveyor.

The blocking gate 264 is positioned between the first end of the conveyor and the proximal wall 282 of the preloading region to selectively preclude passage of cans therebeyond on the conveyor. The blocking gate includes contact surface 289 and actuator 290. The actuator can selectively extend or retract the contact surface 289 so as to be in or out of the path of cans along the conveyor (thereby selectively precluding or allowing cans into the preloading region).

The floor gate 266 is positioned below a slot in the base wall 283, and includes a blade 291 that is selectively extendable through the base wall and into the preloading region 262. An actuator 292 coupled to the blade 291 selectively moves the blade into and out of the blade 291.

The engaging arm assembly 268 comprises a pusher blade 294 and an actuator 296. The actuator is configured to direct the pusher blade 294 through the preloading region from the conveyor side toward box side, to, in turn, push the cans into the box that is in the slot assembly positioned at the first station.

In operation, to load a box that is positioned in the slot assembly positioned at the first station, cans are placed on the conveyor, and the conveyor is actuated. Eventually, the cans approach the preloading region. Initially, the blocking gate 264 is positioned so as to preclude passage of cans therebeyond. Additionally, the floor gate is actuated to preclude the passage of cans therebeyond toward the box side of the preloading region.

The blocking gate is moved so as to permit passage therebeyond by the cans. In the configuration shown, two cans are permitted to pass into the preloading region. The cans are stopped by the blade of the floor gate. The blocking gate is returned to a blocking configuration. Next, the floor gate is removed from the blocking position, and the pusher blade of the engaging arm is actuated so as to direct the two cans toward the box side of the preloading region.

The pusher blade returns to its initial configuration, and the process is repeated two additional times, resulting in three pairs of cans, or a total of six cans, are present in the preloading region. Once all six cans are in the preloading region (this may vary depending on how many cans are to be in the box), the actuator of the engaging arm assembly is actuated to move the pusher blade across the preloading region to the box side to drive the cans into the box positioned within the slot assembly that is in the first station.

The box loader 14 is shown in FIGS. 1, 2, 14 and 15 as comprising blank storage feeder 200, blank arm assembly 202 and grasping assembly 204. The blank storage feeder 200 is configured to receive a plurality of partially assembled box blanks (open ends with four sides formed, in some configurations). The blank arm assembly comprises a first arm 212 and a second arm 214 which depend from the frame and which include a pivot axle 216 spanning therebetween at t distal end thereof. The pivot axle is configured to rotate relative to the arms.

The grasping assembly 204 is coupled to the pivot axle and includes a grasping member 220, an actuator 222 and a forming frame 224. The grasping member 220 includes a grasping block 230 and grasping retainers on an outside surface of the grasping block. The grasping member is coupled to the actuator which is configured to direct the grasping block in an outward and inward direction. The forming frame includes a base 240 proximate the pivot axle, an upper wall 242 and a lower wall 244.

In operation, the pivot axle 216 is rotated relative to the first and second arm so as to align the grasping block and grasping retainers with a blank. The actuator 222 directs the grasping retainers into contact with the next blank and retains the blank. The actuator retracts the grasping block to move the blank toward the pivot axle. As the blank is moving, it will eventually contact and coact with the forming frame which forms the blank into a box shape with open ends. Next, the structure is rotated about the pivot axle and aligned with a slot assembly (in the configuration shown, at station eight), and through the grasping member the box is directed into the slot assembly. Once in the slot assembly, the grasping retainers release the box, and the cycle can be repeated.

Figure 5:
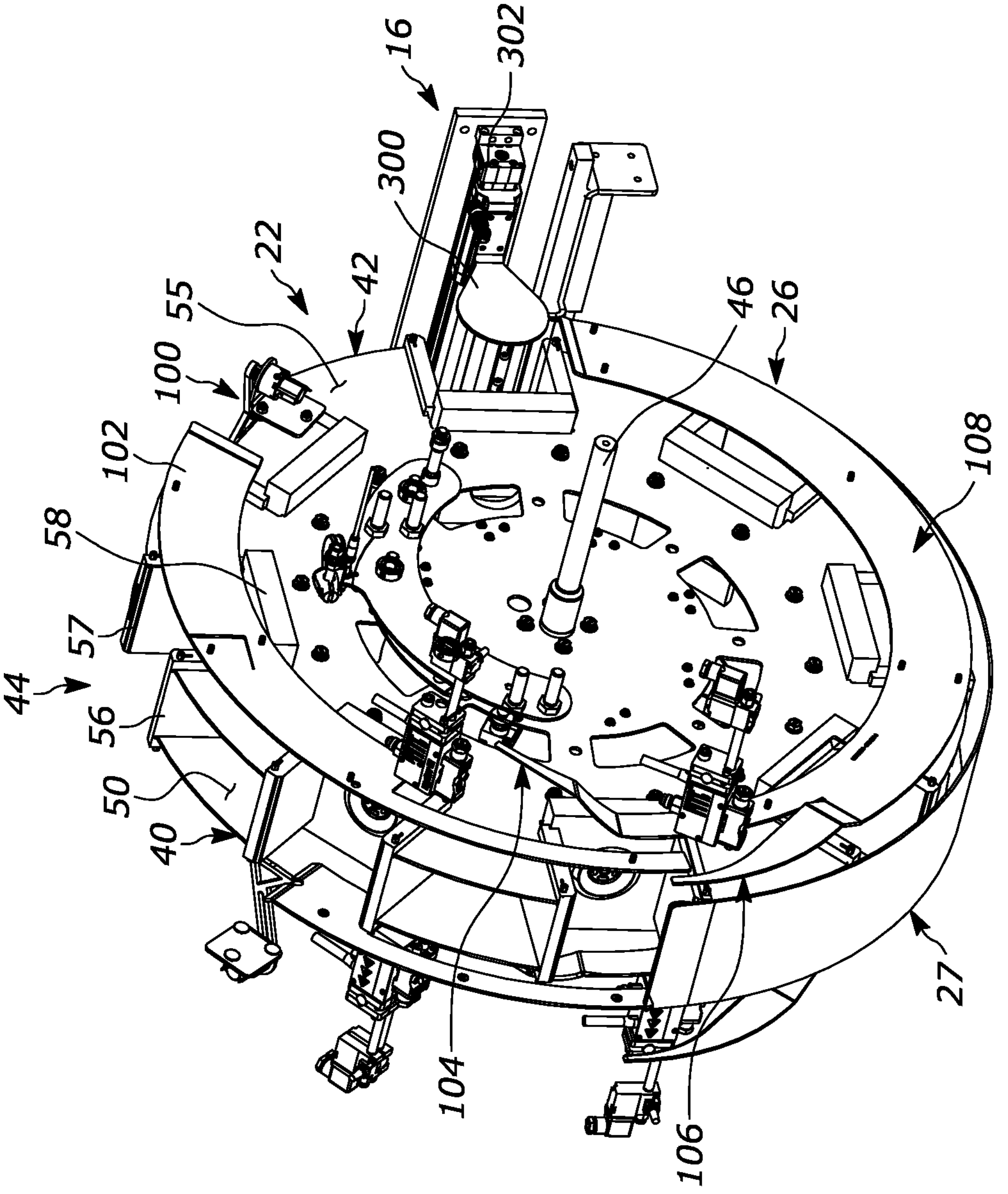
FIG. 5 of the drawings is a back perspective view of a portion of the box forming carousel apparatus, and the unloader, of the present disclosure.

With reference to FIGS. 1, 2 and 5, and, as identified above, the unloader 16 is shown as comprising paddle 300 and actuator 302. The unloader 16 is positioned proximate the seventh station. The paddle 300 is coupled to the actuator 302, with the actuator configured to engage the package that is positioned in the seventh station and push the package through the slot assembly of the rotating carton retainer. It is contemplated that the unloader 16 can be configured to direct the package out of the slot assembly beyond the inner plate and from the front of the frame, or beyond the outer plate and from the back of the frame. In some configurations, a conveyor can be positioned at the output of the unloader. In other configurations, the package may be rotated or translated as the package is exiting the box forming carousel apparatus.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A package forming system comprising:

a box forming carousel apparatus comprising:

a frame having a bottom, a first side and a second side;

a rotating carton retainer rotatably coupled to the frame, the rotating carton retainer including a plurality of slot assemblies radially spaced apart, each slot assembly having a leading wall, a following wall and a base wall, each slot assembly structurally configured to retain a box therein;

a first side carton folding assembly structurally configured to fold a plurality of flaps of the box on a first side thereof;

a second side carton folding assembly structurally configured to fold a plurality of flaps of the box on a second side thereof;

an inner plate and an outer plate spaced apart from the inner plate, with the slot assemblies being formed in the inner and outer plates; and an axle extending between the first side and the second side of the frame spaced apart from the bottom of the frame, with the rotating carton retainer rotating about the axle;

a box loader structurally configured to direct boxes into at least one of the slot assemblies; and a can loader attached to a front of the frame, the can loader comprising an engaging arm assembly configured to direct a group of cans into a box that is positioned within at least one of the slot assemblies, and, a conveyor extending substantially parallel to the inner and outer plates.

2. The package forming system of claim 1, wherein the first and second sides are substantially parallel to each other, with the axle being perpendicular thereto.

3. The package forming system of claim 1 wherein the inner and outer plate define a disk configuration, with each defining an outer edge, with the leading wall, the following wall and the base wall of each of the slot assemblies spanning therebetween.

4. The package forming system of claim 3 further comprising a lower guide spaced apart from the rotating carton retainer and extending for at least a portion of a lower end of the inner and outer plates.

5. The package forming system of claim 4 wherein at least a portion of a lower end of the inner and outer plates comprises an arcuate length that is approximately 180° of a rotation of the rotating carton retainer.

6. The package forming system of claim 1 wherein the rotating carton retainer includes eight spaced apart slot assemblies defining eight stations.

7. The package forming system of claim 1 wherein the first side carton folding assembly is disposed on a front side of the rotating carton retainer further comprises a first trailing side flap fold arm, a first leading side flap folding surface, a first lower flap folding guide, a first upper flap folding guide and a first final folding surface.

8. The package forming system of claim 7 wherein the first trailing side flap fold arm comprises an axis of rotation wherein the distal end is configured to extend proximate the rotating carton retainer to contact and fold a first trailing side flap of the box.

9. The package forming system of claim 7 wherein the first leading side flap fold surface includes a leading edge and an inner surface, positioned in front of the rotating carton retainer, and structurally configured to contact and fold a first leading side flap of the box.

10. The package forming system of claim 7 wherein the first lower flap folding guide comprises a contact edge positioned in front of the rotating carton retainer, and structurally configured to contact and fold a lower flap of the box.

11. The package forming system of claim 10 wherein the first lower flap folding guide further includes a transition portion that extends from the contact edge and which is inclined toward the rotating carton retainer.

12. The package forming system of claim 7 wherein the first upper flap folding guide further includes a contact edge positioned in front of the rotating carton retainer, and structurally configured to contact and fold an upper flap of the box.

13. The package forming system of claim 7 further including at least one glue actuator positioned proximate at least one of the first lower flap folding guide and the first upper flap folding guide.

14. The package forming system of claim 1 wherein the second side carton folding assembly is disposed on a back side of the rotating carton retainer further comprises a second trailing side flap fold arm, a second leading side flap folding surface, a second lower flap folding guide, a second upper flap folding guide and a second final folding surface.

15. The package forming system of claim 14 further including at least one glue actuator positioned proximate at least one of the second lower flap folding guide and the second upper flap folding guide.

16. The package forming system of claim 1 wherein:

the rotating carton retainer includes eight spaced apart slot assemblies defining eight stations;

the first side carton folding assembly spans at least three stations; and the second side carton folding assembly spans at least three stations.

17. The package forming system of claim 16 wherein the second side carton folding assembly initiates engagement with the box prior to the first side carton folding assembly.

18. The package forming system of claim 1 further comprising:

an unloader structurally configured to unload at least one package that includes a box and at least one can from at least one of the slot assemblies.

19. A method of box forming using the system of claim 1 comprising the steps of:

directing a box into a slot assembly of the plurality of slot assemblies at an eighth station;

rotating the rotating carton retainer so that the box moves to a first station;

inserting at least one can into the box at the first station;

rotating the rotating carton retainer through at least a second station, a third station, a fourth station, a fifth station and a sixth station;

sealing the plurality of flaps of the box on the first side thereof during the rotation from the first station through the sixth station;

sealing the plurality of flaps of the box of the second side thereof during the rotation from the second station through the sixth station;

rotating the box to a seventh station; and removing the box at the seventh station.

* * * * *